United States Patent
Krishnaswamy (10) Patent No.: US 11,225,569 B2
(45) Date of Patent: Jan. 18, 2022

(54) BLENDS OF THERMOPLASTIC URETHANES AND ETHYLENE VINYL ACETATE COPOLYMERS

(71) Applicant: BRASKEM AMERICA, INC., Philadelphia, PA (US)

(72) Inventor: Rajendra K. Krishnaswamy, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 252 days.

(21) Appl. No.: 16/654,634

(22) Filed: Oct. 16, 2019

(65) Prior Publication Data

US 2020/0123358 A1    Apr. 23, 2020

Related U.S. Application Data (60) Provisional application No. 62/746,914, filed on Oct. 17, 2018.

(51) Int. Cl.
*C08L 23/08* (2006.01)
*C08L 75/04* (2006.01)

(52) U.S. Cl.
CPC .......... *C08L 23/0853* (2013.01); *C08L 75/04* (2013.01); *C08L 2205/03* (2013.01)

(58) Field of Classification Search
CPC .. C08L 23/0853; C08L 75/04; C08L 2205/03; C08L 2205/08
See application file for complete search history.

(56) References Cited

U.S. PATENT DOCUMENTS

| | | | |
|---|---|---|---|
| 4,468,427 A | 8/1984 | Degrassi et al. | |
| 2001/0008687 A1 | 7/2001 | Kollaja et al. | |
| 2004/0171753 A1* | 9/2004 | Agrawal | C08L 23/0853 525/123 |
| 2004/0171766 A1 | 9/2004 | Agrawal et al. | |
| 2010/0239803 A1 | 9/2010 | Farkas et al. | |
| 2012/0214938 A1 | 8/2012 | Mannari | |
| 2016/0174725 A1 | 6/2016 | Takaoka | |
| 2017/0002199 A1* | 1/2017 | Henze | H01B 3/10 |

FOREIGN PATENT DOCUMENTS

CN    103382297 A    11/2013
WO    2018045443 A1    3/2018

OTHER PUBLICATIONS

Dutta et al.; Polymer-Plastics Technology and Engineering, 2016, vol. 56, Issue 4, p. 1-45.*
Schobert, H.; Chemistry of Fossil Fuels and Biofuels, 2013, p. 103-131.*
Naskar et al.; RSC Advances, 2014, p. 1-34.*
Shamekhi et al.; Plastics, Rubber and Composites, 2014, vol. 43, No. 6, p. 202-210.*

* cited by examiner

*Primary Examiner* — Robert S Jones, Jr.
(74) *Attorney, Agent, or Firm* — Jeffrey N. Townes; Cozen O'Connor (57) ABSTRACT

This invention relates to an elastomer composition comprising: about 10-85 wt % of ethylene-vinyl acetate copolymer, optionally based on ethylene produced from a bio-based carbon source; about 15-90 wt % of thermoplastic polyurethane; and about 0-10 wt % of a compatibilizer. This invention also relates to a molding product formed from the elastomer composition.

25 Claims, 6 Drawing Sheets

BLENDS OF THERMOPLASTIC URETHANES AND ETHYLENE VINYL ACETATE COPOLYMERS

PRIORITY CLAIM

This application claims priority, under 35 U.S.C. § 119(e), to U.S. Provisional Application No. 62/746,914, filed Oct. 17, 2018, hereby incorporated by reference in its entirety.

FIELD OF THE INVENTION

This invention relates to an elastomer composition comprising a thermoplastic polyurethane component and an ethylene-vinyl acetate component.

BACKGROUND OF THE INVENTION

Thermoplastic polyurethanes have been used in sporting goods because of their beneficial properties such as high abrasion resistance, high shear strength, and high elasticity. Despite these good properties, the sporting footwear industry has been searching for more environment-friendly materials. Partially bio-based thermoplastic urethanes have been developed in certain commercial athletic footwear. The bio-based content of many commercially available bio-based thermoplastic urethanes, however, is only about 30%.

There thus remains a need in the art to develop an environmentally sustainable elastomer composition that has a higher bio-based carbon content than the elastomer composition based on pure thermoplastic polyurethanes, while maintaining a performance comparable to or better than the elastomer composition based on pure thermoplastic polyurethanes.

SUMMARY OF THE INVENTION

One aspect of the invention relates to an elastomer composition comprising: about 10-85 wt % of ethylene-vinyl acetate copolymer, about 15-90 wt % of thermoplastic polyurethane, and about 0-10 wt % of a compatibilizer. The ethylene-vinyl acetate copolymer can be based on an ethylene produced from a bio-based carbon source.

Another aspect of the invention relates to a molding product formed from the elastomer composition comprising: about 10-85 wt % of ethylene-vinyl acetate copolymer, about 15-90 wt % of thermoplastic polyurethane, and about 0-10 wt % of a compatibilizer, wherein the ethylene-vinyl acetate copolymer is optionally based on an ethylene produced from a bio-based carbon source.

Another aspect of the invention relates to an elastomer composition comprising: about 10-85 wt % of ethylene-vinyl acetate copolymer, about 15-90 wt % of thermoplastic polyurethane, and about 0-10 wt % of a compatibilizer. The elastomer composition has a melting point of at least 200° C. The elastomer composition has a tensile modulus of at least 20 MPa.

Another aspect of the invention relates to a molding product formed from the elastomer composition comprising: about 10-85 wt % of ethylene-vinyl acetate copolymer, about 15-90 wt % of thermoplastic polyurethane, and about 0-10 wt % of a compatibilizer, wherein the elastomer composition has a melting point of at least 200° C. and a tensile modulus of at least 20 MPa.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

This invention relates to an elastomer composition comprising a thermoplastic polyurethane (TPU) component and an ethylene-vinyl acetate (EVA) component, both of which optionally have a bio-based carbon content. The elastomer composition has a higher melting point and improved tensile properties, as compared to the same elastomer composition without the EVA component.

One aspect of the invention relates to an elastomer composition comprising: about 10-85 wt % of ethylene-vinyl acetate copolymer, about 15-90 wt % of thermoplastic polyurethane; and about 0-10 wt % of a compatibilizer. The ethylene-vinyl acetate copolymer can be based on an ethylene produced from a bio-based carbon source.

Another aspect of the invention relates to an elastomer composition comprising: about 10-85 wt % of ethylene-vinyl acetate copolymer, about 15-90 wt % of thermoplastic polyurethane, and about 0-10 wt % of a compatibilizer. The elastomer composition has a melting point of at least 200° C. The elastomer composition has a tensile modulus of at least 20 MPa.

The EVA copolymer, also known as poly (ethylene-vinyl acetate) (PEVA), is the copolymer of ethylene and vinyl acetate. The EVA copolymer may have the structure of Any type of EVA copolymer known to one skilled in the art is suitable to be used herein. For instance, the three typical types of EVA copolymers, which differ in the vinyl acetate (VA) content and the way the materials are used, including those based on a low VA content (approximately up to 4%) that are processed as thermoplastic materials, those based on a medium VA content (approximately 4-30%) that are processed as thermoplastic elastomer materials, and those based on a high VA content (greater than 33% or even greater than 40%) that are used as ethylene-vinyl acetate rubber, are all suitable to be used herein.

The VA content in the EVA copolymer typically ranges from about 2 to about 40 wt %, with the remainder being the ethylene content. For instance, the VA content in the EVA copolymer can range from about 2 to about 35 wt %, from about 12 to about 33 wt %, from about 15 to about 30 wt %.

The term "bio-based" as used herein refers to a material that has a fraction of its carbon content sourced from biological materials or agricultural resources, rather than from fossil carbon resources.

Suitable EVA copolymers include those that are bio-based. The bio-based carbon content of the EVA copolymer is typically from the ethylene component. The bio-based ethylene (or renewable ethylene) is typically made from ethanol, which becomes ethylene after a dehydration process. Ethanol can be produced from any plant-based materials. For instance, ethanol can be produced by fermenting starch or sugar from various bio-based feedstocks, including but not limited to, corn, sugar cane, sugar beet, wheat grain, etc. Ethanol can also be produced from enzymatically decomposing various cellulosic feedstocks, such as grasses, wood, algae, or other plants.

Using the bio-based ethylene in the EVA copolymer has many advantages. One benefit is that the so-produced EVA copolymer is green and environment friendly. For instance, per ton of green polyethylene produced, roughly 2.15 ton of $CO_2$ can be sequestrated which comes from the $CO_2$ absorbed by the sugar cane while growing, minus the $CO_2$ emitted through the production process. The bio-based ethylene in the EVA copolymer can also be recycled in the same waste streams as traditional polyethylenes.

The EVA copolymer can have a bio-based carbon content of from about 1% to about 100%. The use of bio-based ethylene in the EVA copolymer can produce EVA copolymers with a very high bio-based carbon content. For instance, the EVA copolymer can have a bio-based carbon content of at least 10%, at least 20%, at least 30%, at least 40%, at least 50%, at least 60%, at least 70%, at least 80%, at least 90%, or virtually 100%. The bio-based carbon content of the EVA copolymer can be tested by methods known to one skilled in the art. For instance, the EVA copolymer can be analytically tested for $^{14}C$. The bio-based carbon content can be measured following the procedures set by ASTM D6866.

The TPU copolymer is a block copolymer containing hard and soft blocks or domains formed by the reaction of a diisocyanate, a chain extender or short-chain diol, and a polyol or long-chain diol. Any type of TPU copolymer known to one skilled in the art is suitable to be used herein. Various types of TPU copolymers can be produced by varying the ratio, structure, and/or molecular weight of the above reaction components, to fine-tune the TPU copolymer's structure to the desired final properties of the material. For example, a greater ratio of hard to soft blocks will result in a more rigid TPU, while a greater ratio of soft or hard blocks will result in a more flexible TPU.

Suitable TPU copolymers can be polyester-based, e.g., mainly derived from adipic acid esters, or polyether-based, e.g., mainly based on tetrahydrofuran (THF) ethers. Exemplary TPU copolymers are Epamould (Epaflex Polyurethanes S.r.l., Italy), Epaline (Epaflex Polyurethanes S.r.l.), Epacol (Epaflex Polyurethanes S.r.l.), Pakoflex (Epaflex Polyurethanes S.r.l.), Elastollan® (BASF, Michigan), Pearlthane® (Lubrizol, Ohio), Pearlthane® ECO (Lubrizol), Estane® (Lubrizol), Pellethane® (Lubrizol), Desmopan®

(Covestro, Germany), New Power® (New power industrial limited, Hong Kong), Irogran® (Huntsman, Tex.), Avalon® (Huntsman), Exelast EC (Shin-Etsu Polymer Europe B.V., Netherlands), Laripur® (C.O.I.M. S.p.A., Italy), Isothane® (Greco, Taiwan), Zythane™ (Alliance Polymers & Services, Michigan), and TPU 95A (Ultimaker, Netherlands).

Suitable TPU copolymers also include those that are bio-based. In one embodiment, the thermoplastic polyurethane is at least partially bio-based. The TPU copolymer can have a bio-based carbon content of at least 10%, at least 20%, at least 30%, at least 40%, at least 50%, at least 60%, at least 70%, or at least 80%.

Blending a bio-based EVA copolymer with a TPU copolymer that is at least partially bio-based can increase the bio-based carbon content of the elastomer composition relative to the elastomer composition that contains only pure TPU component. Accordingly, the elastomer composition can have an overall bio-based carbon content of at least 20%, at least 30%, at least 40%, at least 50%, at least 60%, at least 70%, at least 80%, or at least 90%.

Blending an EVA component with a TPU component can also lower the weight of the elastomer composition, to produce a lightweight final product. This is because the density of a TPU copolymer typically ranges from about 1.05 to about 1.20 g/cm$^3$, whereas the density of an EVA copolymer typically ranges from about 0.92 to about 0.95 g/cm$^3$, which is significantly lower than that of the TPU copolymer.

The TPU component and the EVA component in the elastomer composition can be compatible with each other, possibly due to the interactions or reactivity between the vinyl acetate content of the EVA component and the urethane groups in the TPU component.

The elastomer composition can also comprise one or more compatibilizers to facilitate blending the two polymeric components together. Suitable compatibilizers include an organic peroxide; a compatibilizing ethylene copolymer; a compatibilizer comprising an epoxy resin and a styrene-based polymer; polycarbonate polyols; polybutadiene polyols; polysiloxane polyols; and combinations thereof.

Suitable organic peroxides include, but are not limited to, 3-hydroxy-1,1-dimethylbutyl peroxyneodecanoate, α-cumyl peroxyneodecanoate, t-amyl peroxyneodecanoate, t-butyl peroxyneodecanoate, 2-hydroxy-1,1-dimethylbutyl peroxyneoheptanoate, α-cumyl peroxyneoheptanoate, t-butyl peroxyneoheptanoate, di-(2-ethylhexyl) peroxydicarbonate, di-(n-propyl) peroxydicarbonate, di-(sec-butyl) peroxydicarbonate, t-amyl peroxypivalate, t-butyl peroxypivalate, di-iso-nonanoyl peroxide, di-dodecanoyl peroxide, 3-hydroxy-1,1-dimethylbutylperoxy-2-ethylhexanoate, di-decanoyl peroxide, 2,2'-azobis (isobutyronitrile), di-(3-carboxypropionyl) peroxide, 2,5-dimethyl-2,5-di-(2-ethylhexanoylperoxy) hexane, dibenzoyl peroxide, t-amylperoxy-2-ethylhexanoate, t-butylperoxy-2-ethylhexanoate, t-butyl peroxyisobutyrate, t-butyl peroxy (cis-3-carboxy) propenoate, 1,1-di-(t-amylperoxy) cyclohexane, 1-di-(t-butylperoxy)-3,3,5-trimethylcyclohexane, 1-di (t-butylperoxy) cyclohexane, o-t-amyl-o-(2-ethylhexyl) monoperoxycarbonate, o-t-butyl-o-isopropyl-monoperoxycarbonate, o-t-butyl-o-(2-ethylhexyl) monoperoxycarbonate, polyester tetrakis (t-butyl peroxycarbonate), 2,5-dimethyl-2,5-di-(benzoylperoxy) hexane, t-amyl peroxyacetate, t-amyl peroxybenzoate, t-butyl peroxyisononanoate, t-butyl peroxyacetate, t-butyl peroxybenzoate, di-t-butyl diperoxyphthalate, 2,2-di-(t-butylperoxy) butane, 2,2-di-(t-amyloperoxy) propane, n-butyl 4,4-di-(t-butylperoxy) valerate, ethyl 3,3-di-(t-amyloperoxy) butyrate, ethyl 3,3-di-(t-butylperoxy) butyrate, dicumyl peroxide, α, α'-bis-(t-butylperoxy) di-isopropylbenzene, 2,5-dimethyl-2,5-di-(t-butylperoxy) hexane, di-(t-amyl) peroxide, t-butyl α-cumyl peroxide, di-(t-butyl) peroxide, 2,5-dimethyl-2,5-di-(t-butylperoxy)-3-hexane, 3,6,9-triethyl-3,6,9-trimethyl-1,4,7-triperoxinonane, and mixtures thereof.

Suitable compatibilizing ethylene copolymer are those having the formula E-X, E-Y, or E-X-Y, wherein E is ethylene, X is an α, β-ethylenically unsaturated monomer derived from an alkylacrylate, alkylmethacrylate, alkyl vinyl ether, carbon monoxide, sulfur dioxide, or mixtures thereof (wherein each alkyl group independently contains 1-8 carbon atoms), and Y is an α, β-ethylenically unsaturated monomer containing a reactive group that can form a covalent bond with the TPU copolymer component and/or the EVA copolymer component. In one embodiment, X is methyl acrylate, ethyl acrylate, ethyl methylacrylate, or butyl acrylate. In one embodiment, Y is glycidyl methacrylate, glycidyl ethylacrylate, or glycidyl butylacrylate. An exemplary compatibilizer is ethylene-methyl acrylate-glycidyl methacrylate (E-MA-GMA) terpolymer.

Suitable compatibilizers comprising an epoxy resin and a styrene-based polymer can be prepared by blending epoxy resins with a styrene-based polymer. The specific epoxy resins utilized can be prepared by reacting an epoxide-containing compound such as epichlorohydrin with a polyhydric compound such as glycerine or a bisphenol in the presence of sufficient basic material to bind the hydrochloric acid to form epoxy-terminated prepolymers. Epoxies may also be prepared by epoxidation of polyolefins with a peroxidizing agent such as peracetic acid. A variety of epoxy resins are available commercially in a wide range of epoxy content, molecular weight, softening point and compositions, which can also be used herein. Suitable styrene-based polymers include, but are not limited to, homopolymers of styrene, α-methylstyrene, and p-methylstyrene; a high-impact polystyrene modified with a rubber-like polymer such as styrene-butadiene copolymer rubbers, ethylene-propylene copolymer rubbers; ethylene-propylene-diene terpolymer rubbers; a styrene-maleic anhydride copolymer; a styrene-acrylonitrile copolymer; a styrene-acrylonitrile-butadiene terpolymer; a styrene-methylmethacrylate copolymer; and the like. An exemplary compatibilizer is styrene acrylonitrile (SA)-epoxy.

Suitable polycarbonate polyols include, but are not limited to, polycarbonate polyols such as polycarbonate diol (e.g., poly(propylene carbonate (PPC)-diol) or polycarbonate triol; polycaprolactone polyol; alkoxylated polyol; and mixtures thereof. The polyol can be a diol, triol, tetrol, or any other polyol or combinations thereof. An exemplary compatibilizer is poly(propylene carbonate (PPC)-diol.

Suitable polybutadiene polyols include, but are not limited to, those hydroxyl-functionalized polybutadiene with an average hydroxyl functionality ranging from about 2 to about 3.

Suitable polysiloxane polyols include, but are not limited to, those polymers having a polysiloxane backbone with terminal or pendant hydroxyl groups, for instance, the polybutadiene polyols described in U.S. Pat. No. 5,916,992, which is incorporated herein by reference in its entirety.

The amount of thermoplastic polyurethane copolymer in the elastomer composition can range from about 10 to about 85 wt % of the total elastomer composition, for instance, from about 10 to about 70 wt %, from about 10 to about 55 wt %, from about 10 to about 45 wt %, from about 10 to about 40 wt %, or from about 15 to about 35 wt %.

The amount of ethylene-vinyl acetate copolymer in the elastomer composition can range from about 15 to about 90 wt % of the total elastomer composition, for instance, from about 30 to about 90 wt %, from about 45 to about 90 wt %, from about 55 to about 90 wt %, from about 60 to about 90 wt %, or from about 65 to about 85 wt %.

The compatibilizer is optionally present in the elastomer composition, and in an amount ranging from about 0 to about 10 wt % of the total elastomer composition, for instance, from about 0.1 to about 10 wt %, from about 0.2 to about 8 wt %, or from about 0.5 to about 5 wt %.

In one embodiment, the elastomer composition comprises about 10-85 wt % of ethylene-vinyl acetate copolymer, about 15-90 wt % of thermoplastic polyurethane, and about 0-10 wt % of a compatibilizer.

In one embodiment, the elastomer composition comprises about 10-40 wt % of ethylene-vinyl acetate copolymer, about 60-90 wt % of thermoplastic polyurethane, and about 0-5 wt % of a compatibilizer.

In one embodiment, the elastomer composition comprises about 15-35 wt % of ethylene-vinyl acetate copolymer, about 65-85 wt % of thermoplastic polyurethane, and about 0-5 wt % of a compatibilizer.

In one embodiment, the elastomer composition comprises about 15-35 wt % of ethylene-vinyl acetate copolymer, about 65-85 wt % of thermoplastic polyurethane, and about 0.5-5 wt % of a compatibilizer.

The elastomer composition may also comprise a rubber component. The rubber component can comprise a natural rubber (NR), a synthetic rubber, or a mixture thereof. Representative synthetic rubbery polymers include diene-based synthetic rubbers, such as homopolymers of conjugated diene monomers, and copolymers and terpolymers of the conjugated diene monomers with monovinyl aromatic monomers and trienes. Exemplary diene-based compounds include, but are not limited to, polyisoprene (IR) such as 1,4-cis-polyisoprene and 3,4-polyisoprene; neoprene; polystyrene; styrene butadiene rubber (SBR); polybutadiene (BR); 1,2-vinyl-polybutadiene; butadiene-isoprene copolymer; butadiene-isoprene-styrene terpolymer; isoprene-styrene copolymer; styrene/isoprene/butadiene copolymers; styrene/isoprene copolymers; emulsion styrene-butadiene copolymer; solution styrene/butadiene copolymers; butyl rubber such as isobutylene rubber; ethylene/propylene copolymers such as ethylene propylene diene monomer (EPDM) or ethylene propylene rubber (EPM); and blends thereof. A rubber component, having a branched structure formed by use of a polyfunctional modifier such as tin tetrachloride, or a multifunctional monomer such as divinyl benzene, may also be used. Additional suitable rubber components include nitrile rubber, acrylonitrile-butadiene rubber (NBR), silicone rubber (e.g., rubber methylvinyl silicone, dimethyl silicone rubber, etc.), the fluoroelastomers, acrylic rubbers (alkyl acrylate copolymer (ACM), such as ethylene acrylic rubber), epichlorohydrin rubbers, chlorinated polyethylene rubbers such as chloroprene rubbers, chlorosulfonated polyethylene rubbers, hydrogenated nitrile rubber, hydrogenated isoprene-isobutylene rubbers, tetrafluoroethylene-propylene rubbers, and blends thereof.

The amount of the rubber component in the elastomer composition can range from about 0 to about 50 wt % of the total elastomer composition, for instance, from about 0.5 to about 40 wt %, from about 1 to about 30 wt %, or from about 5 to about 20 wt %.

The elastomer composition can also be used as a replacement of rubbers, for the applications where rubbers are used.

The elastomer composition discussed above according to this invention exhibits superior properties. For instance, the elastomer composition comprising both the TPU component and the EVA component crystallizes faster, resulting in a higher melting point, as compared to the same elastomer composition without the EVA component. The elastomer composition comprising both the TPU component and the EVA component also has reduced melt rheology (as measured by melt viscosity |η*| values), as compared to the same elastomer composition without the EVA component. Lastly, the elastomer composition comprising both the TPU component and the EVA component has also improved tensile properties, as compared to the same elastomer composition without the EVA component, including increased tensile modulus, increased strain-hardening, and increased tensile break stress at certain EVA concentrations.

The elastomer composition prepared by blending the TPU component and the EVA component, alone or in combination with a compatibilizer and/or a rubber component, can obtain a melting point (melting peak temperature) of at least about 198° C., at least about 200° C., at least about 201° C., at least about 202° C., at least about 203° C., or at least about 204° C.

The elastomer composition prepared by blending the TPU component and the EVA component, alone or in combination with a compatibilizer and/or a rubber component, can obtain a tensile modulus of at least about 20 MPa, at least about 35 MPa, at least about 45 MPa, at least about 50 MPa, at least about 60 MPa, at least about 66 MPa, at least about 70 MPa, or at least about 80 MPa, measured with a standard ASTM D638.

The elastomer composition prepared by blending the TPU component and the EVA component, alone or in combination with a compatibilizer and/or a rubber component, increases the tensile modulus by at least about 200%, at least about 2.5 folds, at least about 3.3 folds, at least about 4 folds, or at least about 5 folds, as compared to the same elastomer composition without the ethylene-vinyl acetate copolymer.

The elastomer composition prepared by blending the TPU component and the EVA component, alone or in combination with a compatibilizer and/or a rubber component, can obtain a tensile break stress of at least about 35 MPa, at least about 40 MPa, at least about 45 MPa, or at least about 50 MPa, measured with a standard ASTM D638.

The elastomer composition prepared by blending the TPU component and the EVA component, alone or in combination with a compatibilizer and/or a rubber component, can have a tensile break stress comparable to, or increased by about 1-25%, as compared to the same elastomer composition without the ethylene-vinyl acetate copolymer.

Accordingly, one aspect of the invention also relates to a wide variety of molding products formed from the elastomer composition described supra. Such molding products can be built, shaped, molded and cured by various methods known to one skilled in the art.

All above descriptions and all embodiments in the context of the elastomer composition are applicable to this aspect of the invention relating to a molding product.

Suitable molding products include, but are not limited to, a footwear product, an automotive product, a furniture product, a textile product, a sports/recreation product, or a consumer electronic product. Exemplary molding products include a shoe sole or a shoe part, film, tube, fiber, cable, ear tag, automotive part, automobile part, hose, belt, damping element, armrest, furniture element, ski boot, stop buffer, roller, ski goggle, powder slush, aerials and aerial feet, handles, housing, switch, and cladding and cladding element.

EXAMPLES

The following examples are for illustrative purposes only and are not intended to limit, in any way, the scope of the present invention.

Example 1—Preparation of Elastomer Compositions Containing TPU and EVA

The thermoplastic polyurethane (TPU) component used was commercially available Pearlthane® ECO 12T95 (Lubrizol, Ohio), a thermoplastic polyurethane containing about 32% bio-based content. This partially bio-based TPU has a performance similar to the traditional TPU without bio-based content.

The ethylene-vinyl acetate copolymer (EVA) component used in the examples below included commercially available Evateno® 8019PE (Braskem, Brazil), which contains about 19% vinyl acetate content with a melt flow rate of about 8 g/10 min (190° C./2.16 kg), measured with a ASTM-D1238 standard. The ethylene-vinyl acetate copolymer (EVA) used also included commercially available Evateno® HM728 (Braskem, Brazil), which contains about 28% vinyl acetate content with a melt flow rate of about 6 g/10 min (190° C./2.16 kg), measured with a ASTM-D1238 standard. If not specified, the former EVA with 19% vinyl acetate content was used in the elastomer compositions. The latter EVA with 28% vinyl acetate content was used in the elastomer samples referred to as "high VA."

Exemplary elastomer compositions were prepared by blending the TPU and EVA components discussed above at a TPU/EVA weight ratio of 15/85, 30/70, 45/55, 55/45, 70/30, and 85/15, respectively. In various examples below, certain elastomer compositions also contained a compatibilizer, such as an organic peroxide, ethylene methyl acrylate-glycidyl methacrylate (E-MA-GMA) terpolymer (e.g., LOTADER® AX8900), or styrene acrylonitrile (SA)-epoxy (e.g., JONCRYL® ADR-4300).

The compounding and extrusion of the components to prepare the elastomer compositions was accomplished using a 18 mm twin-screw extruder (Coperion GmbH, Germany) using the following temperature profile on an eight-zone extruder: 220/220/210/200/190/190/180/170 (° C.). All samples were produced at a rate of 10 lbs/hour rate and a screw speed of 300 rpm. All materials were dried before compounding.

Example 2—Characterization of the Elastomer Compositions Containing TPU and EVA In this example, the melting and crystallization, melting rheology, and tensile properties of the elastomer compositions prepared according to Example 1 were characterized.

All of the physical and mechanical testing was performed according to ASTM standards.

Melting and Crystallization

The melting and crystallization profiles were collected using a TA1000 differential scanning calorimetry (DSC). The specimens were cooled from the molten state (from 220° C.) at 10° C./minute to capture the crystallization exotherm. The subsequent heating scans were performed at 20° C./min to capture the details of the melting endotherm.

Figure 1:
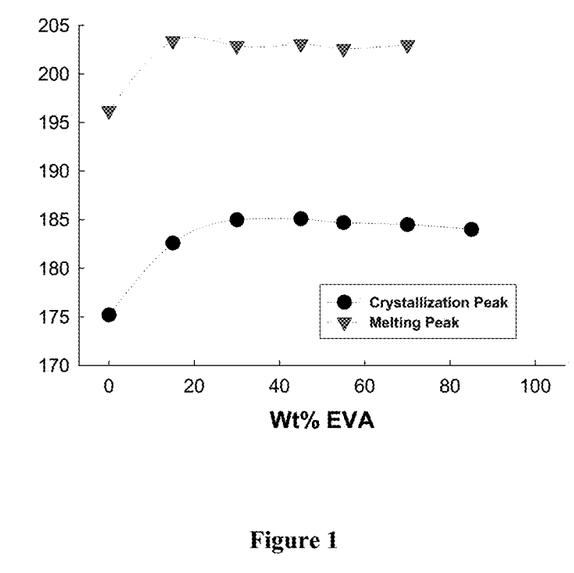
FIG. 1 shows the results of the melting peak temperatures and crystallization peak temperatures for the elastomer compositions containing the blends of the thermoplastic polyurethane (TPU) and ethylene-vinyl acetate (EVA) components at a TPU/EVA weight ratio of 15/85, 30/70, 45/55, 55/45, 70/30, 85/15, and 100/0 (i.e., pure TPU) respectively.

The melting peak temperatures and crystallization peak temperatures for the elastomer compositions containing the blends of the TPU and EVA components at a TPU/EVA weight ratio of 15/85, 30/70, 45/55, 55/45, 70/30, 85/15, and 100/0 (i.e., pure TPU) respectively, using an EVA containing about 19% vinyl acetate content, are shown in FIG. 1. FIG. 1 shows that the TPU component crystallized faster in the presence of the EVA component, resulting in a higher melting point when the elastomer composition contained an increased amount of the EVA component.

Heat of fusion [TPU hard] remains constant (~4 J/g) for EVA concentrations ranging from 0-70%, based on the observations from the DSC tests performed.

Melting Rheology

The melting rheological data were collected using an ARES torsional rheometer. A standard frequency sweep was conducted at 220° C. for all of the samples. The melt flow data were measured with an ASTM D1238 standard.

Figure 2:
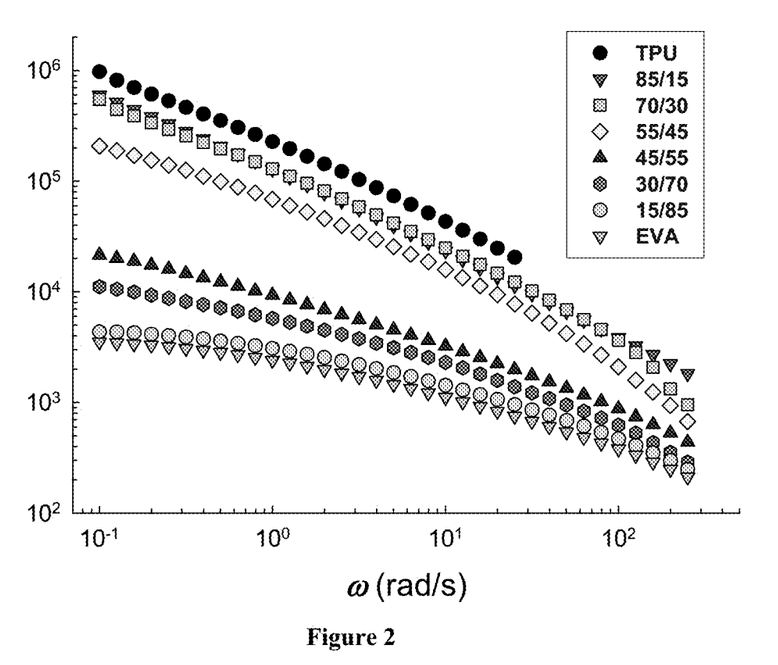
FIG. 2 shows the melt viscosity $|\eta^*|$ values for the elastomer compositions containing the blends of the TPU and EVA components at a TPU/EVA weight ratio of 15/85, 30/70, 45/55, 55/45, 70/30, and 85/15, respectively.

The melt viscosity $|\eta^*|$ values for the elastomer compositions containing the blends of the TPU and EVA components at a TPU/EVA weight ratio of 15/85, 30/70, 45/55, 55/45, 70/30, and 85/15, respectively, using an EVA containing about 19% vinyl acetate content, are shown in FIG. 2.

Figure 3:
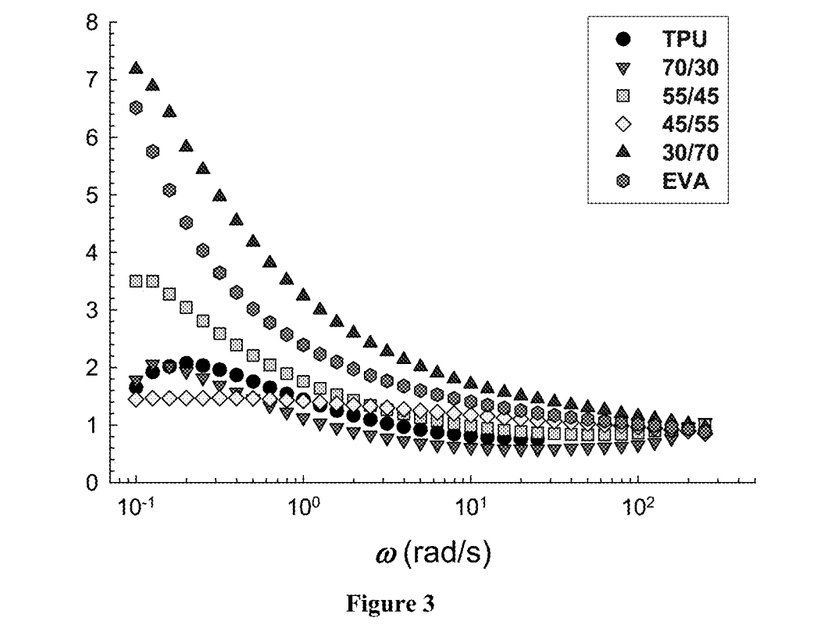
FIG. 3 shows the tan δ values for the elastomer compositions containing the blends of the TPU and EVA components at a TPU/EVA weight ratio of 30/70, 45/55, 55/45, and 70/30, respectively.

The tan δ values for the elastomer compositions containing the blends of the TPU and EVA components at a TPU/EVA weight ratio of 30/70, 45/55, 55/45, and 70/30, respectively, using an EVA containing about 19% vinyl acetate content, are shown in FIG. 3.

Figure 4:
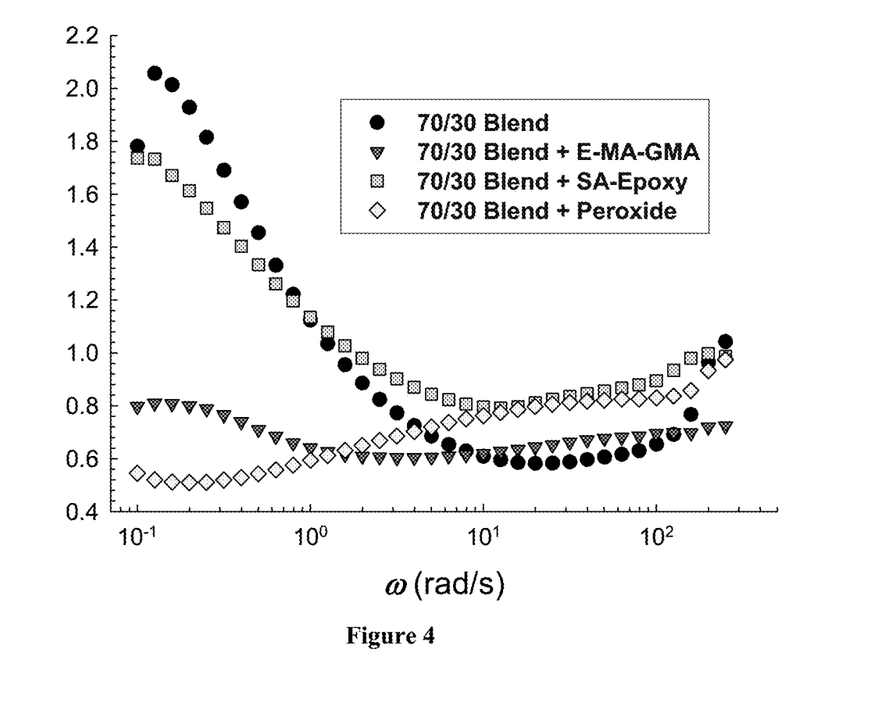
FIG. 4 shows the tan δ values for the elastomer compositions containing the blends of the TPU and EVA components at a TPU/EVA weight ratio of 70/30 and a compatibilizer (an organic peroxide, E-MA-GMA terpolymer, or SA-epoxy, respectively), as compared to the tan δ value for the same composition without the compatibilizers.

The tan δ values for the elastomer compositions containing the blends of the TPU and EVA components at a TPU/EVA weight ratio of 70/30 (using an EVA containing about 19% vinyl acetate content) and a compatibilizer (an organic peroxide, E-MA-GMA terpolymer, or SA-epoxy, respectively), as compared to the tan δ value for the same composition without the compatibilizers, are shown in FIG. 4. The amount of organic peroxide used was at 0.05 wt % loading. The amount of SA-epoxy used was at 2 wt % loading. The amount of E-MA-GMA used was at 5 wt % loading.

Tensile Properties

All tensile tests were measured with a standard ASTM D638. Izod impact was measured accord to ASTM D256 standard.

Figure 5:
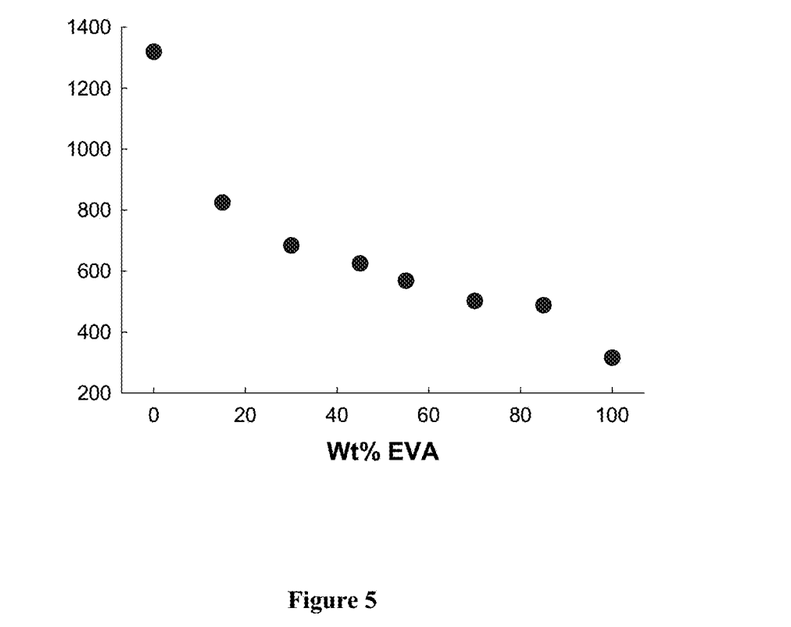
FIG. 5 shows the tensile elongation results for the elastomer compositions containing the blends of the TPU and EVA components at a TPU/EVA weight ratio of 0/100 (i.e., pure EVA), 15/85, 30/70, 45/55, 55/45, 70/30, 85/15, and 100/0 (i.e., pure TPU), respectively.

FIG. 5 shows the tensile elongation results for the elastomer compositions containing the blends of the TPU and EVA components at a TPU/EVA weight ratio of 0/100 (i.e., pure EVA), 15/85, 30/70, 45/55, 55/45, 70/30, 85/15, and 100/0 (i.e., pure TPU), respectively, using an EVA containing about 19% vinyl acetate content.

Figure 6:
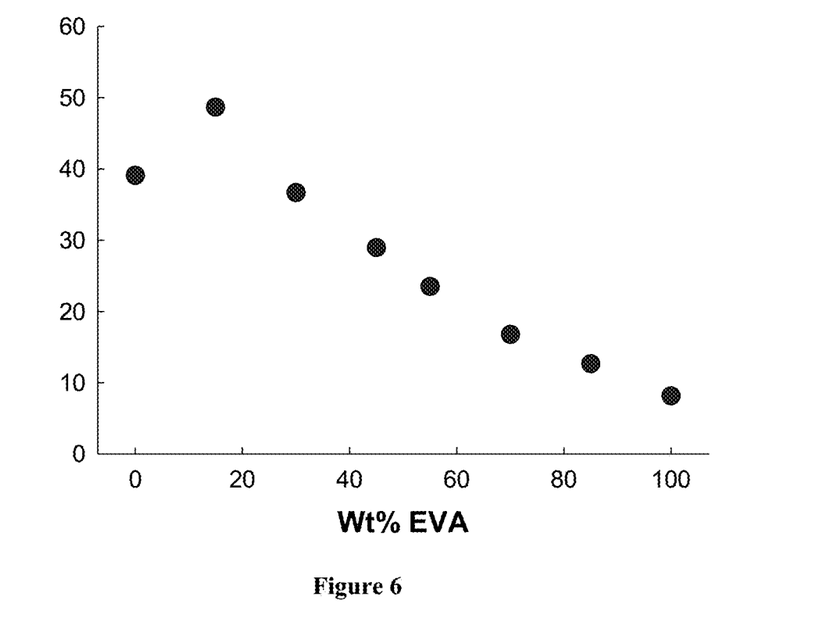
FIG. 6 shows the tensile break stress results for the elastomer compositions containing the blends of the TPU and EVA components at a TPU/EVA weight ratio of 0/100, 15/85, 30/70, 45/55, 55/45, 70/30, 85/15, and 100/0, respectively.

FIG. 6 shows the tensile break stress results for the elastomer compositions containing the blends of the TPU and EVA components at a TPU/EVA weight ratio of 0/100, 15/85, 30/70, 45/55, 55/45, 70/30, 85/15, and 100/0, respectively, using an EVA containing about 19% vinyl acetate content. As shown in FIG. 6, the tensile break stress of the elastomeric composition increased about 10 MPa (~25%) when blending EVA (15 wt %) in the elastomeric composition, as compared to that of the pure TPU polymer, although the tensile break stress dropped again when the amount of EVA in the elastomeric composition was further increased.

Figure 7:
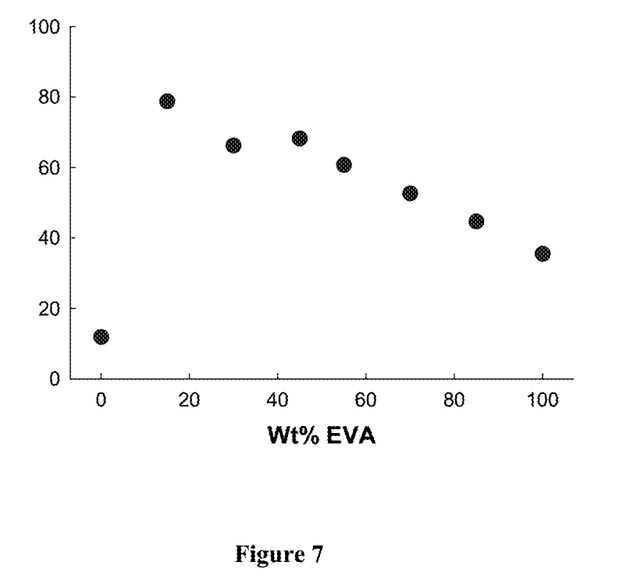
FIG. 7 shows the tensile modulus results for the elastomer compositions containing the blends of the TPU and EVA components at a TPU/EVA weight ratio of 0/100, 15/85, 30/70, 45/55, 55/45, 70/30, 85/15, and 100/0, respectively.

FIG. 7 shows the tensile modulus results for the elastomer compositions containing the blends of the TPU and EVA components at a TPU/EVA weight ratio of 0/100, 15/85, 30/70, 45/55, 55/45, 70/30, 85/15, and 100/0, respectively, using an EVA containing about 19% vinyl acetate content.

As shown in FIG. 7, the tensile modulus of the elastomeric composition increased about 65 MPa (greater than 4 fold) and peaked at about 80 MPa when blending EVA (15 wt %) in the elastomeric composition, as compared to the pure TPU polymer, although the tensile modulus dropped again when the amount of EVA in the elastomeric composition was further increased. However, all the elastomeric compositions having EVA component showed significantly higher tensile modulus properties than that of the pure TPU polymer.

Figure 8:
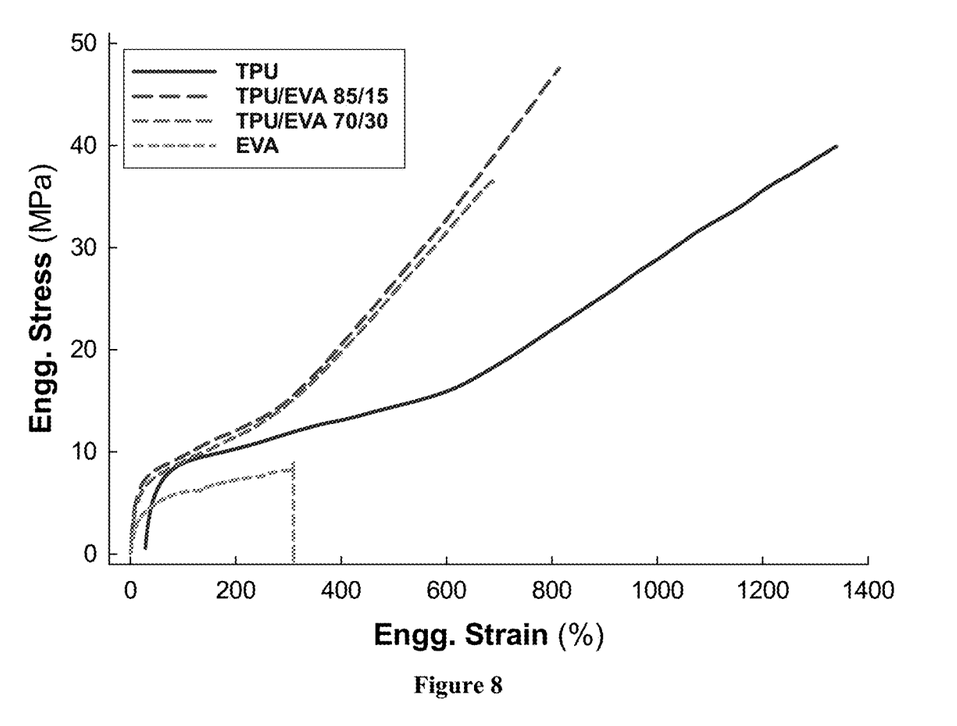
FIG. 8 shows the tensile strain-hardening results for the elastomer compositions containing the blends of the TPU and EVA components at a TPU/EVA weight ratio of 0/100, 70/30, 85/15, and 100/0, respectively.

FIG. 8 shows the tensile strain-hardening results for the elastomer compositions containing the blends of the TPU and EVA components at a TPU/EVA weight ratio of 0/100, 70/30, 85/15, and 100/0, respectively, using an EVA containing about 19% vinyl acetate content. As shown in FIG. 8, the strain-hardening in the elastomeric compositions containing the blends of the TPU and EVA components were greater than that of the pure TPU polymer.

Figure 9:
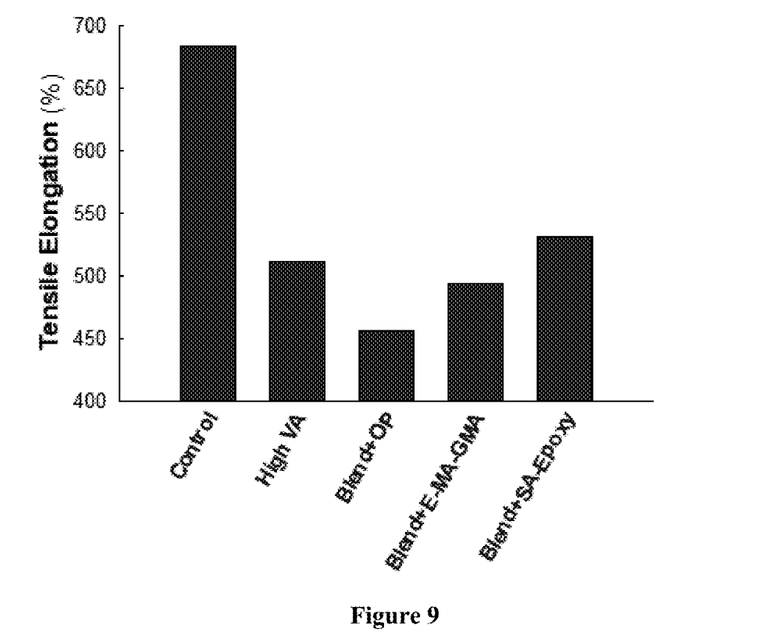
FIG. 9 shows the tensile elongation results for the elastomer compositions containing the blends of the TPU and EVA components at a TPU/EVA weight ratio of about 70/30 and a compatibilizer (an organic peroxide—Blend+OP; E-MA-GMA terpolymer—Blend+E-MA-GMA; or SA-epoxy—Blend+SA-Epoxy; respectively), as compared against the tensile elongation results of the control (having a blend of the TPU and EVA components at a TPU/EVA weight ratio of about 70/30, using an EVA containing about 19% vinyl acetate content, without a compatibilizer) and high VA (having a blend of the TPU and EVA components at a TPU/EVA weight ratio of about 70/30, using an EVA containing about 28% vinyl acetate content, without a compatibilizer).

FIG. 9 shows the tensile elongation results for the elastomer compositions containing the blends of the TPU and EVA components at a TPU/EVA weight ratio of about 70/30 and a compatibilizer (an organic peroxide—Blend+OP; E-MA-GMA terpolymer—Blend+E-MA-GMA; or SA-epoxy—Blend+SA-Epoxy; respectively), as compared against the tensile elongation results of the control (having a blend of the TPU and EVA components at a TPU/EVA weight ratio of about 70/30, using an EVA containing about 19% vinyl acetate content, without a compatibilizer) and high VA (having a blend of the TPU and EVA components at a TPU/EVA weight ratio of about 70/30, using an EVA containing about 28% vinyl acetate content, without a compatibilizer). The amount of organic peroxide used was at 0.05 wt % loading. The amount of SA-epoxy used was at 2 wt % loading. The amount of E-MA-GMA used was at 5 wt % loading.

Figure 10:
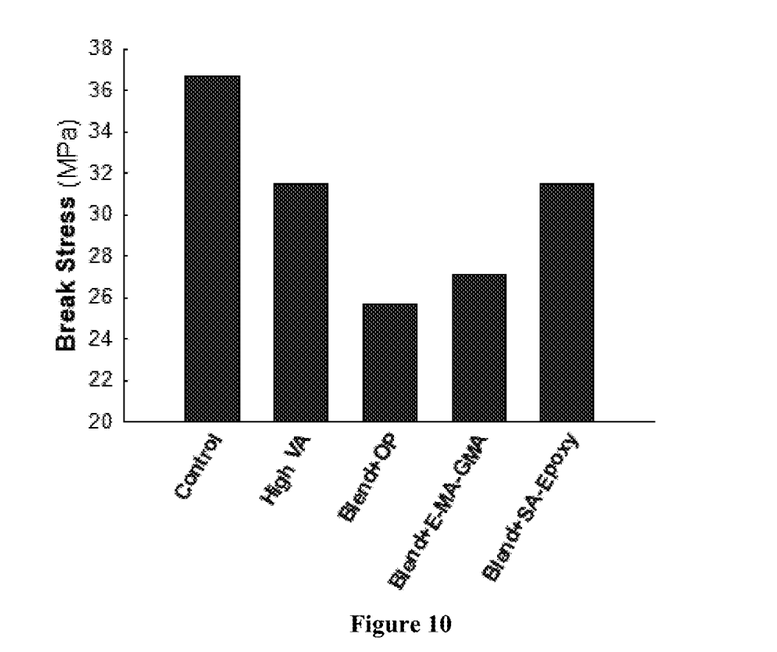
FIG. 10 shows the tensile break stress results for the elastomer compositions containing the blends of the TPU and EVA components at a TPU/EVA weight ratio of about 70/30 and a compatibilizer (an organic peroxide, E-MA-GMA terpolymer, or SA-epoxy, respectively), as compared against the tensile elongation results of the control (having a blend of the TPU and EVA components at a TPU/EVA weight ratio of about 70/30, using an EVA containing about 19% vinyl acetate content, without a compatibilizer) and high VA (having a blend of the TPU and EVA components at a TPU/EVA weight ratio of about 70/30, using an EVA containing about 28% vinyl acetate content, without a compatibilizer).

FIG. 10 shows the tensile break stress results for the elastomer compositions containing the blends of the TPU and EVA components at a TPU/EVA weight ratio of about 70/30 and a compatibilizer (an organic peroxide, E-MA-GMA terpolymer, or SA-epoxy, respectively), as compared against the tensile elongation results of the control (having a blend of the TPU and EVA components at a TPU/EVA weight ratio of about 70/30, using an EVA containing about 19% vinyl acetate content, without a compatibilizer) and high VA (having a blend of the TPU and EVA components at a TPU/EVA weight ratio of about 70/30, using an EVA containing about 28% vinyl acetate content, without a compatibilizer). The amount of organic peroxide used was at 0.05 wt % loading. The amount of SA-epoxy used was at 2 wt % loading. The amount of E-MA-GMA used was at 5 wt % loading.

Figure 11:
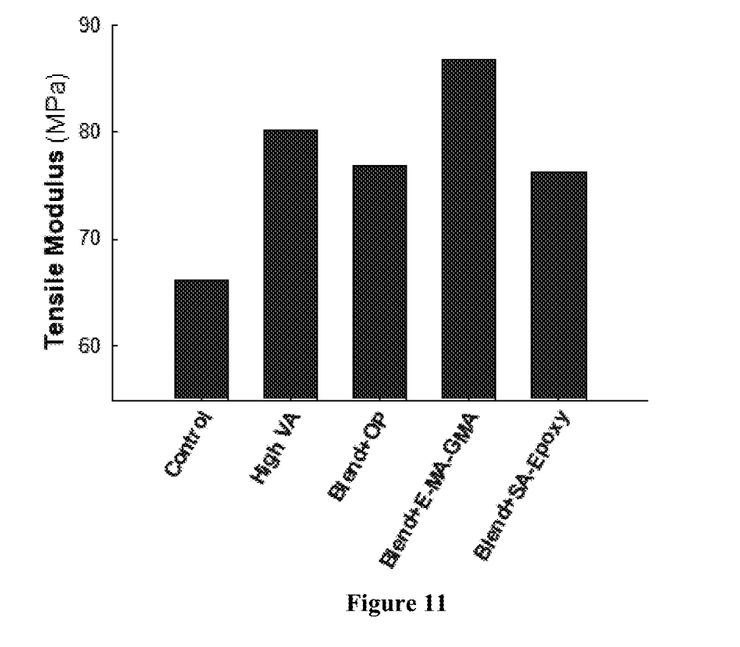
FIG. 11 shows the tensile modulus results for the elastomer compositions containing the blends of the TPU and EVA components at a TPU/EVA weight ratio of about 70/30 and a compatibilizer (an organic peroxide, E-MA-GMA terpolymer, or SA-epoxy, respectively), as compared against the tensile elongation results of the control (having a blend of the TPU and EVA components at a TPU/EVA weight ratio of about 70/30, using an EVA containing about 19% vinyl acetate content, without a compatibilizer) and high VA (having a blend of the TPU and EVA components at a TPU/EVA weight ratio of about 70/30, using an EVA containing about 28% vinyl acetate content, without a compatibilizer).

FIG. 11 shows the tensile modulus results for the elastomer compositions containing the blends of the TPU and EVA components at a TPU/EVA weight ratio of about 70/30 and a compatibilizer (an organic peroxide, E-MA-GMA terpolymer, or SA-epoxy, respectively), as compared against the tensile elongation results of the control (having a blend of the TPU and EVA components at a TPU/EVA weight ratio of about 70/30, using an EVA containing about 19% vinyl acetate content, without a compatibilizer) and high VA (having a blend of the TPU and EVA components at a TPU/EVA weight ratio of about 70/30, using an EVA containing about 28% vinyl acetate content, without a compatibilizer). The amount of organic peroxide used was at 0.05 wt % loading. The amount of SA-epoxy used was at 2 wt % loading. The amount of E-MA-GMA used was at 5 wt % loading.

What is claimed is:

1. An elastomer composition comprising:
   about 10-85 wt % of ethylene-vinyl acetate copolymer, wherein the ethylene-vinyl acetate copolymer is optionally based on ethylene produced from a bio-based carbon source;
   about 15-90 wt % of thermoplastic polyurethane; and
   about 0-10 wt % of a compatibilizer,
   wherein the elastomer composition has a tensile modulus of at least 20 MPa.

2. The elastomer composition of claim 1, wherein the ethylene-vinyl acetate copolymer has a bio-based carbon content of from about 1% to about 100%.

3. The elastomer composition of claim 2, wherein the ethylene-vinyl acetate copolymer has a bio-based carbon content of at least 50%.

4. The elastomer composition of claim 1, wherein the vinyl acetate content in the ethylene-vinyl acetate copolymer ranges from about 2 to about 40 wt %.

5. The elastomer composition of claim 1, wherein the thermoplastic polyurethane is polyester-based or polyether-based.

6. The elastomer composition of claim 1, wherein the thermoplastic polyurethane is at least partially bio-based.

7. The elastomer composition of claim 6, wherein the thermoplastic polyurethane has a bio-based carbon content of at least 30%.

8. The elastomer composition of claim 1, wherein the elastomer composition has a bio-based carbon content of at least 40%.

9. The elastomer composition of claim 1, wherein the compatibilizer is present and comprises an organic peroxide, ethylene methyl acrylate-glycidyl methacrylate (EMA-GMA) terpolymer, styrene acrylonitrile (SA)-epoxy, polypropylene carbonate (PPC)-diol, or combinations thereof.

10. The elastomer composition of claim 1, comprising:
    about 10-40 wt % of ethylene-vinyl acetate copolymer,
    about 60-90 wt % of thermoplastic polyurethane, and
    about 0-5 wt % of a compatibilizer.

11. The elastomer composition of claim 10, comprising:
    about 15-35 wt % of ethylene-vinyl acetate copolymer,
    about 65-85 wt % of thermoplastic polyurethane.

12. The elastomer composition of claim 10, comprising:
    about 0.5-5 wt % of a compatibilizer.

13. An elastomer composition comprising:
    about 10-85 wt % of ethylene-vinyl acetate copolymer, wherein the ethylene-vinyl acetate copolymer is optionally based on ethylene produced from a bio-based carbon source;
    about 15-90 wt % of thermoplastic polyurethane; and
    about 0-10 wt % of a compatibilizer,
    wherein the elastomer composition has a melting point of at least 200° C.

14. An elastomer composition comprising:
    about 10-85 wt % of ethylene-vinyl acetate copolymer, wherein the ethylene-vinyl acetate copolymer is optionally based on ethylene produced from a bio-based carbon source;
    about 15-90 wt % of thermoplastic polyurethane; and
    about 0-10 wt % of a compatibilizer,
    wherein the elastomer composition has a tensile modulus increase of at least 200%, as compared to a same elastomer composition without the ethylene-vinyl acetate copolymer.

15. The elastomer composition of claim 11, wherein the elastomer composition has a tensile break stress of at least 40 MPa.

16. The elastomer composition of claim 11, wherein the elastomer composition has a tensile break stress increase of at least 10%, as compared to a same elastomer composition without the ethylene-vinyl acetate copolymer.

17. The elastomer composition of claim 1, further comprising:
a rubber component comprising a natural rubber, a synthetic rubber, or a mixture thereof.

18. A molding product formed from the elastomer composition of claim 1.

19. The molding product of claim 18, wherein the molding product is a footwear product, automotive product, furniture product, textile product, sports/recreation product, or consumer electronic product.

20. The molding product of claim 19, wherein the molding product is a shoe sole or a shoe part, film, tube, fiber, cable, ear tag, automotive part, automobile part, hose, belt, damping element; armrest, furniture element, ski boot, stop buffer, roller, ski goggle, powder slush, aerials and aerial feet, handles, housing, switch, or cladding and cladding element.

21. An elastomer composition comprising:
about 10-85 wt % of ethylene-vinyl acetate copolymer;
about 15-90 wt % of thermoplastic polyurethane; and
about 0-10 wt % of a compatibilizer,
wherein the elastomer composition has a melting point of at least 200° C., and
wherein the elastomer composition has a tensile modulus of at least 20 MPa.

22. The elastomer composition of claim 13, wherein the thermoplastic polyurethane is at least partially bio-based.

23. The elastomer composition of claim 22, wherein the thermoplastic polyurethane has a bio-based carbon content of at least 30%.

24. The elastomer composition of claim 14, wherein the thermoplastic polyurethane is at least partially bio-based.

25. The elastomer composition of claim 24, wherein the thermoplastic polyurethane has a bio-based carbon content of at least 30%.

* * * * *